United States Patent [19]

Dewing

[11] Patent Number: 4,717,236
[45] Date of Patent: Jan. 5, 1988

[54] OPTICAL FIBER CABLE HAVING A HYDROGEN-ABSORBING ZEOLITE

[75] Inventor: John Dewing, Chester, England

[73] Assignee: STC, PLC, London, England

[21] Appl. No.: 731,900

[22] Filed: May 8, 1985

[30] Foreign Application Priority Data

May 18, 1984 [GB] United Kingdom ............... 8412721

[51] Int. Cl.⁴ .............................................. G02B 6/44
[52] U.S. Cl. ............................... 350/96.23; 350/96.34
[58] Field of Search ........................ 350/96.23, 96.34

[56] References Cited

U.S. PATENT DOCUMENTS 4,629,286 12/1986 Fuse et al. ...................... 350/96.23

FOREIGN PATENT DOCUMENTS

| 174424 | 3/1986 | European Pat. Off. ......... 350/96.23 |
| 195040 | 10/1985 | Japan ............................... 350/96.34 |
| 2087589 | 5/1982 | United Kingdom . |
| 2144879 | 3/1985 | United Kingdom ............. 350/96.23 |
| 2144878 | 3/1985 | United Kingdom ............. 350/96.23 |
| 2144559 | 3/1985 | United Kingdom . |
| 2149935 | 6/1985 | United Kingdom . |

Primary Examiner—William L. Sikes
Assistant Examiner—Frank González
Attorney, Agent, or Firm—Dennis P. Clarke

[57] ABSTRACT

Hydrogen evolution in an optical fibre is suppressed by the incorporation of a hydrogen absorbent material in a water blocking compound with which the cable is filled. Typically the absorbent material is a silver substituted zeolite.

4 Claims, 3 Drawing Figures

OPTICAL FIBER CABLE HAVING A HYDROGEN-ABSORBING ZEOLITE

BACKGROUND OF THE INVENTION

This invention relates to optical fibre cables, and in particular to such cables for submarine use.

A recently discovered problem with optical cables, and particularly submarine optical cables, is that of hydrogen evolution. Over an extended period of time small quantities of hydrogen are, in some circumstances, released from the cable sheathing material. If this hydrogen comes into contact with the silica fibre cores it can diffuse in to form hydroxyl groups. The presence of such groups in an optical fibre is well known to have a deleterious effect on the optical transmission properties of the fibre material.

SUMMARY OF THE INVENTION

The object of the present invention is to minimise or to overcome this disadvantage.

According to one aspect of the invention there is provided an optical fibre cable, including one or more optical fibres contained in a protective sheath, wherein the cable incorporates a hydrogen absorbent material whereby the optical fibres of the cable are maintained in a substantially hydrogen free environment.

According to another aspect of the invention there is provided a method of suppressing hydrogen evolution in an optical fibre cable, the method including filling the cable with a water blocking compound containing a hydrogen absorbent material.

According to a further aspect of the invention there is provided a composition for suppressing hydrogen evolution in an optical fibre cable, the composition comprising a water blocking compound, and a particulate hydrogen absorbent material dispersed in said compound.

BRIEF DESCRIPTION OF THE DRAWINGS

An embodiment of the invention will now be described with reference to the accompanying drawings in which.

DETAILED DESCRIPTION

Figure 1:
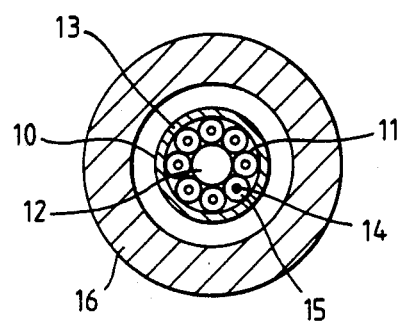
FIG. 1 is a cross-section of the transmission package of an optical fibre cable.

Referring to the drawings, the transmission package comprises a set of plastics packaged optical fibre 11 stranded around a king wire 12, and optionally held together as a bundle by a type wrapping 13, e.g. of a polyester material. Each fibre package 11 has at its core a glass fibre 14, typically of silica having an internal optical waveguiding structure. The glass core 14 is surrounded by plastics material 15 provided in one or more layers to give a measure of protection for the underlying glass fibre and to provide sufficient solutions for the necessary stranding operations involved in the manufacture of the cable. Around this transmission package is extruded a seamless aluminium tube 16 which may be formed by continuous fictional extrusion. A suitable process for extruding the tube 16 is described in our U.K. specification No. 2128358 A.

Figure 2:
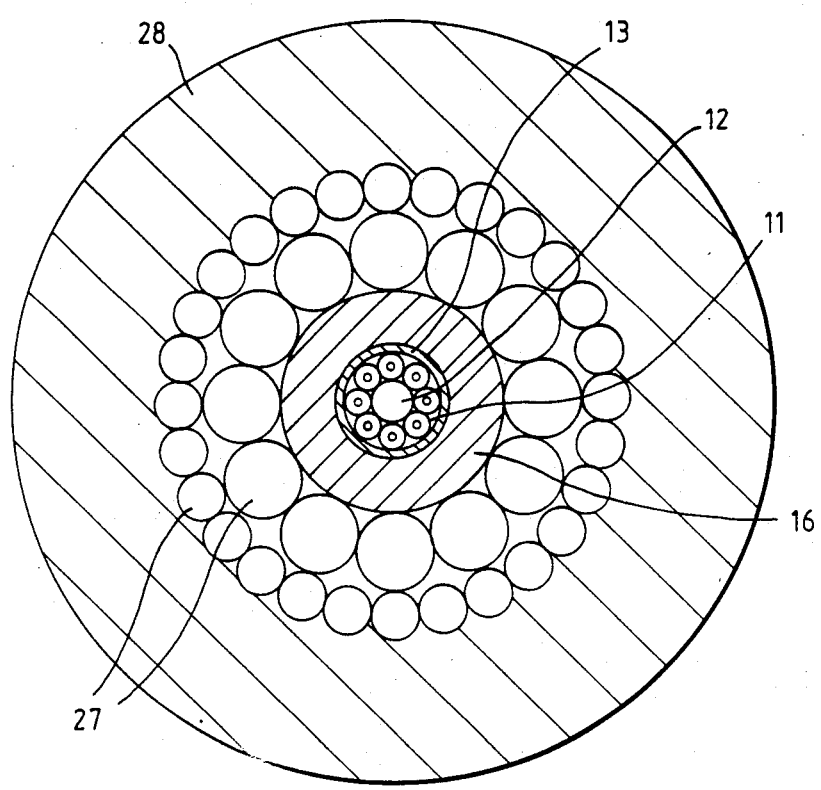
FIG. 2 is a cross-section of a finished cable containing the transmission package of FIG. 1.

The transmission package is contained in an outer sheathing structure comprising one or more layers of steel wires 27 (FIG. 2) and a layer of a plastics material 28. In some applications an external armouring (not shown) may also be applied.

To prevent ingress of moisture the void space of the transmission package is filled with a water blocking compound 18. Typically we employ HYVIS 2000 (registered Trade Mark) for this purpose.

A particulate hydrogen getter material dispersed in the water blocking compound removes traces of hydrogen which may be evolved within the transmission package. For this purpose we prefer to employ a zeolite. These materials include sodium aluminium silicates which are rendered hydrogen absorbent by replacement of at least some of the sodium by an active metal, typically silver. Typically we employ Zealite Y which has the composition $$Na_{54.7}Al_{54.7}Si_{137.3}O_{384} 241 H_2O$$

Some or all of the sodium in this material is replaced by silver and, advantageously, the material is then dehydrated. The composition is then $$(Ag_n, Na_{54.7-n}) Al_{54.7}Si_{137.3}O_{384}$$

The material is crushed to a fine powder and is mixed with the cable water blocking compound in a weight proportion of 0.2 to 15% by weight. Preferably we employ 2% by weight of the zeolite.

The following table shows the effect of adding to a water blocking compound a zeolite in which 71% of the sodium has been substituted by silver. The results are calculated for a cable containing 3.2 g/m of the blocking compound.

| % zeolite by wt | H₂ uptake cc/mm | Safety factor |
|---|---|---|
| 1 | 0.22 | 5 |
| 2 | 0.43 | 10 |
| 5 | 1.08 | 27 |
| 10 | 2.16 | 54 |

The safety factor is based on an anticipated evolution of 0.04 cc/m of hydrogen in a typical optical cable.

The zeolite may be prepared by exchange of the sodium ions with silver from a solution of silver nitrate. In a typical process 15 g of the dried zeolite was mixed with 1 liter of aqueous silver nitrate solution containing 4.469 g of AgNO₃. The mixture was continuously stirred and samples were taken at hourly intervals. To avoid possible photochemical reduction of silver ions to metallic silver the mixture was shielded from ambient light. The samples were filtered to remove solids and, after dilution, were analysed for sodium and silver by atomic emission spectrophotometry. Since the untreated zeolite may contain a slight excess of Na⁺ a blank determination was also made by stirring 3 g of the powdered zeolite in deionised water for the same time periods. The results are summarised in Table 1 below.

TABLE 1

| time hours | Silver Exchange | | |
|---|---|---|---|
|  | Ag⁺ g/l | Na⁺ g/l | Blank Na⁺ g/l |
| 0 | 2.857 | <0.01 | <0.01 |
| 1 | 0.197 | 0.508 | 0.026 |
| 2 | 0.213 | 0.548 | 0.033 |

TABLE 1-continued

| | Silver Exchange | | |
|---|---|---|---|
| time hours | $Ag^+$ g/l | $Na^+$ g/l | Blank $Na^+$ g/l |
| 3 | 0.225 | 0.539 | 0.033 |

These results indicate that the exchange reaches equilibrium after about 2 Hrs. The degree of the exchange may be calculated from the amount of sodium released and/or the amount of silver used. This technique provides about 30% exchange of the sodium ions for silver. The percentage exchange can be increased if necessary to over 90% by one or more further treatments of the material with silver nitrate solution.

Figure 3:
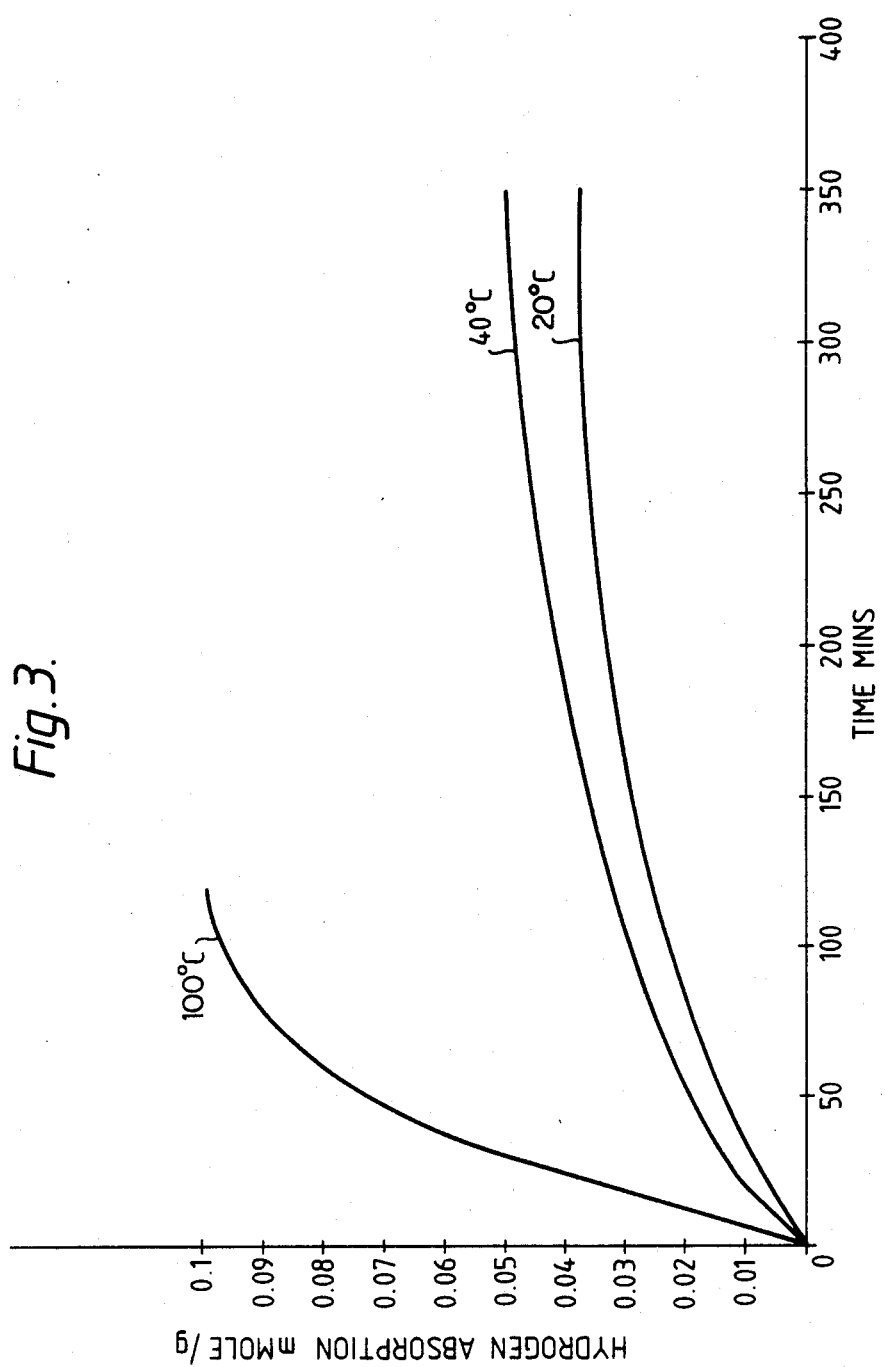
FIG. 3 shows an example of hydrogen absorption characteristics afforded by the invention.

To illustrate the hydrogen scavenging properties of the material samples of a 30% silver substituted zeolite were exposed to hydrogen gas at room temperature, 40° C. and 100° C. The volume of hydrogen absorbed was measured by outgassing of the sample in a standard cell. Typical hydrogen absorption characteristics determined by this technique are shown in FIG. 3 of the accompanying drawings. The results illustrate the efficiency of the material as a hydrogen scavenger.

It will be appreciated that the technique is not limited to the particular cable construction described herein but is of general application to optical cables. Also other hydrogen absorbents may be employed as the cable 'getter' material.

I claim:

1. An optical fiber cable, including one or more optical fibers contained in a protective sheath, the cable being filled with a water blocking compound having dispersed therein a sodium aluminosilicate zeolite in which a portion of the sodium is substituted with silver, the zeolite being hydrogen absorbent such that hydrogen evolved within the cable is absorbed so as to maintain the optical fibers of the cable in a substantially hydrogen free environment.

2. An optical fiber cable as claimed in claim 1 wherein the water blocking compound contains from 0.2 to 15 weight percent of the zeolite.

3. An optical fiber cable as claimed in claim 2, wherein the substitution of sodium by silver is between 30% and 90%.

4. An optical fibre cable, including one or more optical fibres contained in a protective sheath, the cable being filled with a water blocking compound, wherein a hydrogen absorbent zeolite is dispersed in said blocking compound, wherein said zeolite has the composition:

$$(Ag_nNa_{54.7-n}) Al_{54.7}Si_{137.3}O_{384}$$

and wherein said zeolite comprises 0.2 to 15 weight percent of the blocking compound.

* * * * *